(12) United States Patent
Macleod et al.

(10) Patent No.: US 8,720,991 B2
(45) Date of Patent: May 13, 2014

(54) SEAT DIVIDER WITH RECESSED TOP PANEL AND TWO-WAY VIEWING WINDOW

(76) Inventors: Scott Macleod, Mclean, VA (US); Ian Gerard Macleod, Mclean, VA (US); Jennifer Gabriela Macleod, Mclean, VA (US)

(*) Notice: Subject to any disclaimer, the term of this patent is extended or adjusted under 35 U.S.C. 154(b) by 0 days.

(21) Appl. No.: 13/492,446

(22) Filed: Jun. 8, 2012

(65) Prior Publication Data

US 2013/0328357 A1 Dec. 12, 2013

(51) Int. Cl.
| | | |
|---|---|---|
| *B60R 7/04* | (2006.01) | |
| *B60R 11/06* | (2006.01) | |
| *A47C 7/62* | (2006.01) | |
| *A45F 4/00* | (2006.01) | |
| *A47B 83/02* | (2006.01) | |

(52) U.S. Cl.
USPC ............ 297/188.2; 297/135; 297/188.01; 297/188.18; 296/37.15; 224/275; 224/277

(58) Field of Classification Search
USPC ............ 297/135, 188.01, 188.18, 188.2; 296/24.34, 37.15; 224/155, 275, 277, 224/281, 575, 576, 577
See application file for complete search history.

(56) References Cited

U.S. PATENT DOCUMENTS

| | | | | |
|---|---|---|---|---|
| 2,822,968 A * | 2/1958 | Jackson | ............... | 224/275 |
| 2,934,391 A * | 4/1960 | Bohnett | ............... | 297/135 X |
| 3,061,394 A * | 10/1962 | Whetstone | ............ | 224/539 X |
| 3,909,092 A * | 9/1975 | Kiernan | ............... | 224/275 X |
| 4,118,812 A * | 10/1978 | Pangburn | ............... | 5/657 |
| 4,341,418 A * | 7/1982 | Chappell | ............... | 224/275 X |
| 4,512,503 A * | 4/1985 | Gioso | ............... | 224/275 X |
| 4,795,210 A * | 1/1989 | Milat | ............... | 297/188.2 X |
| 4,832,241 A * | 5/1989 | Radcliffe | ............... | 224/275 |
| 4,938,401 A * | 7/1990 | Weisbrodt et al. | ............ | 224/275 |
| 4,949,890 A * | 8/1990 | Schultz | ............... | 224/275 |
| 5,085,153 A * | 2/1992 | McKee | ............... | 108/44 |
| 5,123,707 A * | 6/1992 | Wurzell | ............... | 297/464 |
| 5,255,958 A * | 10/1993 | Frischmann | ............ | 297/464 |
| 5,282,556 A * | 2/1994 | Bossert | ............... | 224/281 X |
| 5,551,616 A * | 9/1996 | Stitt et al. | ............... | 224/275 |
| 5,560,058 A * | 10/1996 | Smith | ............... | 5/513 |
| 5,577,818 A * | 11/1996 | Sayre | ............... | 297/135 X |
| 5,687,651 A * | 11/1997 | Hurayt et al. | ............ | 297/188.01 X |
| 5,803,326 A * | 9/1998 | Krieger et al. | ............ | 224/275 |
| 5,971,487 A * | 10/1999 | Passehl | ............... | 297/188.01 X |
| 6,015,198 A * | 1/2000 | Stair | ............... | 297/188.01 X |
| 6,142,574 A * | 11/2000 | Alexander | ............... | 297/188.2 X |
| 6,149,040 A * | 11/2000 | Walker | ............... | 224/539 |
| 6,260,903 B1 * | 7/2001 | von der Heyde | ............ | 296/24.46 |

(Continued)

*Primary Examiner* — Rodney B White
(74) *Attorney, Agent, or Firm* — Usha S. Koshy

(57) ABSTRACT

A seat divider for an automobile configured to create a barrier between children seated in the back seat of an automobile also allows visual contact and communications between them through a two-way viewing window and a top divider panel that can be raised and lowered when needed. The seat divider holds recessed desk top tables that can be extended and supported through their legs or by the armrests on the back seat for use by the children to read, write, watch DVD's, or play with toys. The seat divider also has storage space and trays to hold toys, books and other material as well as pen and pencil holders. The seat divider has specially configured seat belt and shoulder strap hooks that allow the middle seat belt and shoulder strap to be inserted through them to firmly secure the seat divider to the back seat of the vehicle.

12 Claims, 10 Drawing Sheets

(56) References Cited

U.S. PATENT DOCUMENTS

| | | | |
|---|---|---|---|
| 6,290,277 B1 * | 9/2001 | Spykerman et al. | 296/24.43 |
| 6,308,873 B1 * | 10/2001 | Baldas et al. | 224/281 |
| 6,609,744 B2 * | 8/2003 | Gehring et al. | 296/37.5 |
| 7,201,421 B2 * | 4/2007 | Reynolds et al. | 296/37.5 |
| 7,303,226 B2 * | 12/2007 | Bernstein et al. | 296/37.15 X |
| 7,350,681 B2 * | 4/2008 | Polburn et al. | 224/275 |
| 7,429,078 B1 * | 9/2008 | Tarlow et al. | 297/188.01 |
| 7,455,204 B2 * | 11/2008 | Lippert et al. | 224/275 |
| 7,481,328 B1 * | 1/2009 | Van De Wege et al. | 220/505 |
| 7,562,931 B2 * | 7/2009 | Stojanovic | 297/188.2 X |
| 8,215,693 B2 * | 7/2012 | Ulita | 296/37.1 |
| 8,272,674 B2 * | 9/2012 | Vance | 296/24.46 |
| 2006/0011686 A1 * | 1/2006 | Latham | 224/275 X |
| 2011/0227391 A1 * | 9/2011 | Cahall et al. | 297/464 |

\* cited by examiner

SEAT DIVIDER WITH RECESSED TOP PANEL AND TWO-WAY VIEWING WINDOW

FIELD OF THE INVENTION

The present invention is generally related to automobile seat accessories. More particularly, the invention relates to an automobile seat divider that is specifically configured to act as a physical barrier between children seated next to each other in the rear seat of a vehicle to support the varying circumstances that arise while they are traveling in a car, including, but not limited to the need for full interaction, partial interaction, and isolation amongst the children. The seat divider is configured to provide the means for visual contact and communications between the children in a civil manner and to entertain each other when appropriate.

BACKGROUND OF THE INVENTION

For parents of young children, contemplating a road trip with their children also means bracing themselves for the dreaded barrage of complaints and arguments emanating from the back seat of the vehicle occupied by their children. The perpetual bickering and squabbles between the children, at times escalating into fist fights, can turn even a well planned vacation into a nightmarish and unpleasant journey for the parents as well as the children. The trigger for the discord between the children under these circumstances stems in large measure from the irritation caused by being secured and confined by a seat belt, with little room to move, and forced proximity to a sibling, combined with the boredom from not having much to do. In the physical environment of the car, the siblings have no ability to separate from each other or give each other some distance as they can in other environments such as the home, by leaving the room, going outside, or going to their own bedrooms. At the same time, siblings do enjoy interacting occasionally in a friendly and civil manner while seated next to each other in a car and their companionship can actually keep them from becoming bored especially on long journeys.

Since children's relationships and interactions vary based upon the circumstances of the moment, the challenge is to create a seat divider device for use in the car that can separate children seated next to each other from engaging in destructive behavior and provide them the privacy and distance from each other when needed while at the same time offering them a means to positively interact with each other when they choose to do so.

A few prior art have attempted to isolate young children from each other in an automobile through the use of a seat divider between the children. For example, U.S. Pat. No. 4,938,401 to Weisbrodt et al., describes an automobile passenger seat divider with a polymeric base unit that has cup holders and storage bins along with an insert sleeve for the placement of an insert board to limit both visual and physical contact between children seated next to each other in the rear seat of a vehicle. A drawback of this seat divider is that since the insert board is loosely held on the insert sleeve, children seated on either side of the base unit can easily remove the insert board leaving little or no barrier between them because the rest of the base unit is comprised of only the insert sleeve, the cup holders and marginal bins. Once the seat divider of this prior art is taken apart by a precocious child, the children in the back seat of the vehicle are once again left to continue with their squabbles and complaints resulting in frustration and inconvenience for the parent driver who has to periodically stop the vehicle, disembark, and replace the insert board to restore harmony. A second drawback of this seat divider is that when the insert board is placed within the sleeve of the seat divider, it blocks visual contact between the children which inhibits even civil communication between them if they so desire. A third drawback is that the device offers little means for a child to entertain themselves while in isolation. Specifically, there is no means to access a desktop that can be used for placing reading, writing and/or coloring books and related materials. A fourth drawback is that the device is attached to the seat via an extension of the base plate into the seam of the car seat which "has an approximate length of 1 inch, and approximate width of 2½ inches" and is not as secure or safe as would be the case if the seat divider were secured using the seat belt and shoulder strap of the car.

U.S. Pat. No. 5,123,707 to Wurzell describes a seat divider in the form of an essentially transparent planar element meant to act as a physical barrier between children seated in the back seat of an automobile. A drawback of this seat divider is that it is too low in height to prevent the children from seeing and touching each other. Even an infant could see over the seat divider given the height of a car seat relative to the device. A second drawback is that the physical barrier is stationary and in place at all times, and is not adjustable. A third drawback is that the device offers limited means for a child to entertain themselves while in isolation. As in the seat divider of U.S. Pat. No. 4,938,401 the seat divider of this patent also does not provide the means to have access to a desktop table for reading, writing and other activities, nor does it have storage space for toys and other items of interest. A fourth drawback is that the device is attached to the car seat via a small "tongue member" secured within the seam of the car seat rather than safely secured using the seat belt and shoulder strap of the car. In general, the seat dividers described in these prior art are not sturdy enough to withstand tipping over or preventing the back seat child riders from dismantling the dividers.

The seat dividers described in other prior art such as those in U.S. Pat. No. 5,971,487 to Passehl, U.S. Pat. Appl. Pub. No. 2012/0068490 (Vance), and U.S. Pat. Appl. Pub. No. 2011/0227391 (Cahall et al.) are all substantially rectangular, vertical, dividers, comprising a single block or frame constructed of compressible and deformable material. U.S. Pat. No. 6,142,574 to Alexander is a seat divider that is generally S-Shaped with beverage receptacles and a few pockets, fabricated from a single block of generally light weight rigid material such as foam rubber or Styrofoam. The seat dividers in these prior art principally function to form a complete barrier between children seated next to each other in the rear seat of a motor vehicle and eliminates even periodic visual contacts between the children if they desire to communicate in a civil manner. They also have limited provisions for entertaining the children while thus separated from each other especially during a long journey when children invariably get bored, fidgety, and restless. In addition, the seat dividers of these prior art are sufficiently large and bulky that they make storage infeasible in the trunk or other parts of the car.

Although, the use of seat dividers to keep children separated in the back seat of a vehicle on short or long journey's to curb the verbal and physical fights among them is helpful, seat dividers that create an absolute barrier between the children especially throughout a long journey may prevent otherwise much needed healthy and playful interactions between the children. A seat divider whose sole purpose is to separate children from one another and is not flexible or adjustable to accommodate the varying circumstances encountered while traveling in a car and does not provide optimal remedies, will likely fail to serve the needs of parents and children and potentially exacerbate tensions and child misbehavior in the car. This may explain why the existing prior art spanning well over 30 years has failed to be adopted into the commercial market.

What is needed is an automobile seat divider, which while creating a physical barrier between children to stave off verbal and physical fights can also support the varying circumstances that arise in a car, including but not limited to the need for full interaction, partial interaction, and isolation amongst the children. Further, the seat divider should also be configured to provide a means for the children to make visual contact and periodically communicate with each other in a civil manner and entertain each other when appropriate. In addition, given the importance and need for safety in the modern society, any such seat divider should be securely fastened in place with little to no risk of becoming dislodged or airborne in an accident. Further, to accommodate the needs to at times put an additional child in the middle seat and/or make more room for two adults in the backseat, it is important to have the device compact and portable enough to store in the trunk of even a compact or midsized car. Finally, by having a seat divider with features that do more than simply isolate the children but also entertain them would help achieve the objective of making the driving experience more pleasant and safer for the driver and passengers.

The present invention provides such a seat divider apparatus that is configured with a center top panel structure that can be raised up when needed to block all visual contact between children seated next to each other and lowered when the children want to visually and verbally communicate with each other in a civil manner. An added feature on the top panel structure of the seat divider of the present invention is a two-way viewing window that can be conveniently opened and closed by the child seated on either side of the seat divider through recessed window panes without having to lower the entire top panel. The seat divider of the present invention is also a structure equipped with recessed desktop tables that can be pulled out for use by the child seated on either side of the seat divider when they want to read a book, do some writing, coloring, or playing with toys. The seat divider also has storage space to hold a variety of articles such as books, toys, crayons, pencils and similar provisions for easy access by the child sitting on either side of the seat divider to keep him/her entertained on a short or long journey; resulting in a peaceful and pleasant journey for the children as well as for the parents. Further, the seat divider of the present invention can be securely fastened in place via both the seat belt and shoulder belt of the middle seat and is compact and portable for easy storage in the trunk of a car. The seat divider of the present invention is thus an apparatus that is specifically configured to overcome the deficiencies in the prior art for automobile seat dividers.

SUMMARY OF THE INVENTION

The present invention is an automobile seat divider apparatus configured to create a physical barrier between children seated next to each other in the a rear seat of a vehicle while supporting the varying circumstances that arise in a car, including but not limited to the need for full interaction, partial interaction, and isolation amongst the children. The seat divider of the present invention is configured to provide a means for visual contact and communications between the children in a civil manner and to entertain each other when appropriate.

The primary object of the present invention is to overcome deficiencies in the prior art for child car seat dividers that are generally constructed to completely block visual contact and verbal communications between children seated in the back seat of the vehicle. The seat divider of the present invention overcomes this deficiency through its inclusion of a top divider panel that can be raised and lowered when needed and the additional configuration of a two-way viewing window on the top divider panel capable of being left open when the children need to visually contact and communicate with each other or closed by means of a recessed window pane panel when they opt not to communicate and choose to entertain themselves in their respective sides of the seat divider.

Yet another object of the seat divider of the present invention is to provide a divider that has easily accessible, delineated compartments to store books, toys, pencils, crayons and other such articles for the entertainment of the children and keep them occupied especially during long journeys.

A further, significant object of the seat divider of the present invention is to ensure that the structure is securely fastened to the seat of the car by means of the middle seat belt and shoulder strap so that it does not become dislodged and airborne creating a hazard for the children seated next to it.

In an exemplary embodiment of the present invention, the seat divider has a base structure with front and back panels supporting a middle divider panel. In this embodiment, the middle divider panel has an insert sleeve that runs through its length horizontally and houses a top divider panel that is capable of being raised and lowered when needed by means of knobs placed on either side of the panel. The top divider panel has a two-way viewing window capable of being closed from both sides of the top divider panel using window pane panels recessed within insert sleeves configured at the base of the two-way viewing window. In this embodiment, when the window is in the open position, it also acts as a handle to transport the seat divider.

In the exemplary embodiment of the seat divider of the present invention, a tray structure extends outward from the base of the middle divider panel on either side of the divider panel and holds a vertical tray divider with an adjustable slider that facilitates movement of the vertical tray divider over the tray floor.

In the exemplary embodiment of the seat divider of the present invention, the base of the unit on either side of the divider holds recessed desktop type tables with legs that can be unfolded and the tables extended to a comfortable length for use by the child. In this embodiment, there is also provided a shelf space at the base on either side of the unit for storing books, toys and other articles for the child's use. In this embodiment, the back panel of the unit on both sides of the middle divider panel is configured with pencil/pen holders within easy reach of the child.

In yet another embodiment of the seat divider of the present invention, the desk top tables recessed within the seat divider can be extended and held in place using the seat arm rests next to the windows on either side of the back seat without the need to unfold the legs on the tables.

In all embodiments of the seat divider of the present invention, the back panel of the unit is configured with a shoulder strap attachment hook and a lower seat attachment hook to hold the unit firmly in place on the back seat of a vehicle.

The foregoing summary of the embodiments of the present invention should not be construed to limit the scope of the invention. In this summary of the invention and in the specification in general the various references to "the exemplary embodiment" "related embodiment" or "yet another embodiment" do not necessarily refer to the same embodiment (s). Rather, these references to the various embodiments in general mean that a particular feature, structure, or characteristic described in conjunction with an embodiment is included in at least some embodiments, but not necessarily all embodiments of the invention. The objects, embodiments, and features of the seat divider of the present invention as described in this summary of the invention will be further appreciated and will become obvious to one skilled in the art when viewed in conjunction with the accompanying drawings, detailed description of the invention, and the appended claims.

DETAILED DESCRIPTION OF THE INVENTION

Figure 1:
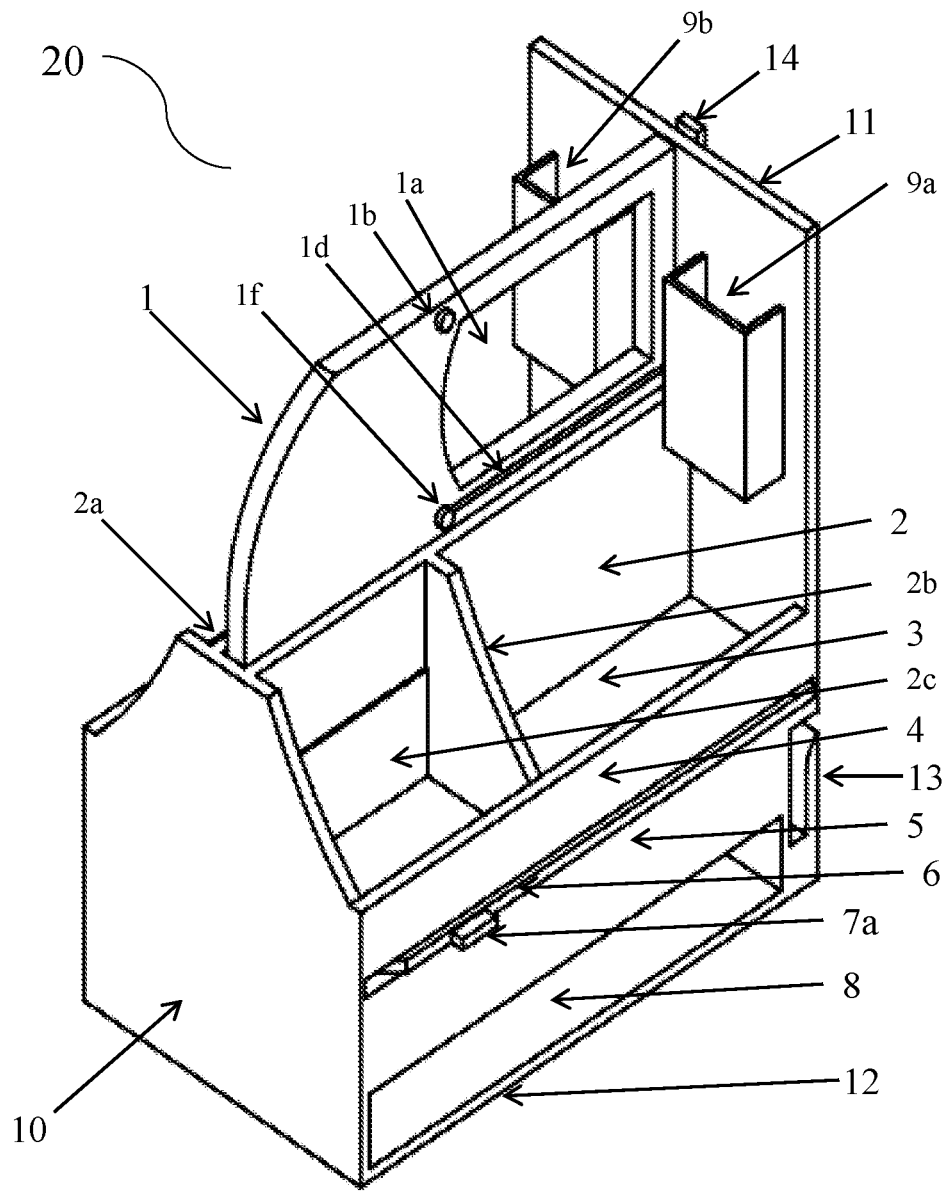
FIG. 1 is a perspective view of the exemplary embodiment of the seat divider of the present invention.

The present invention is an automobile seat divider for use in the rear passenger seat of a vehicle to create a barrier between children seated in the back seat while supporting the varying circumstances that arise in a car, including but not limited to the need for full interaction, partial interaction, and isolation amongst the children. The seat divider of the present invention is configured to provide the means for visual contact and communications between the children in a civil manner and to entertain each other when appropriate.

Referring now to the drawings, it is to be noted that like numerals represent like components in the several views presented and discussed. Specifically referring now to FIG. 1 a perspective view of an exemplary embodiment of the seat divider 20 of the invention is presented to show the general structure of the device. In this embodiment, the seat divider 20 has a front panel 10 a back panel 11 and a base panel 12 which together provide the structural framework and anchor for the internal members of the device. Referring now to the internal structural members within the device, the exemplary feature of the seat divider 20 is the top divider panel 1 shown in its extended position. In its retracted position, the top divider panel 1 is recessed within an insert sleeve 2a that runs horizontally and vertically down the length in the center of the middle divider panel 2. In particular, a knob 1b on the right side of the top divider panel 1 and an identical knob 1c (not shown) on the left side of the top divider panel 1 are used to raise and lower the top divider panel 1. An additional exemplary feature of the top divider panel 1 is a cut out, two-way viewing window 1a which can be used to maintain visual contact between the children seated on either side of the seat divider 20. The two-way viewing window 1a can be closed with a window pane panel recessed within insert sleeves 1d on the right side and 1e on the left side (not shown) at the base of the two-way viewing window 1a. The recessed window pane panels can be raised and lowered with knobs 1f on the right side and 1g on the left side (not shown) of the top divider panel member 1.

Referring again to FIG. 1 The middle divider panel 2 has a tray 3 that extends outward from its base on either side of the middle divider panel 2. The middle divider panel 2 also has a vertical tray divider 2b attached to its side and capable of sliding vertically through the length of the middle divider panel 2 over the tray 3 floor by means of an adjustable slider 2c. A bottom panel 4 with a top lip of sufficient height creates an enclosed bin for storage of toys, books and other materials. The bin space can be enlarged or reduced by sliding the vertical tray divider 2b along the length of the tray 3 floor. A panel 5 below panel 4 has a cut out open shelf 8 which provides additional storage space for toys, books and other materials for the entertainment of the child. An identical set of panels and a cut out open shelf (not shown) are located on the left side of the seat divider 20 for the use of the child seated on that side. Additional storage for pencils, pens, crayons and other instruments are provided in the form of holders 9a and 9b located on the top of the front face of the back panel 11.

Additional, exemplary features of the seat divider 20 shown in FIG. 1 include the insert sleeve 6 configured between panel 4 and panel 5 which holds a desk top table recessed within the insert sleeve 6 that can be dislocated and extended by operating the lever 7a. An identical insert sleeve with a separate recessed desktop table extendable by a lever 7b (not shown) is located on the left side of the seat divider 20. The seat divider 20 is held firmly in place through its base 12 on the back seat of the vehicle by threading the middle seat belt through the hook like seat belt attachment 13 and on the top through a shoulder strap attachment 14 configured on the back panel 11.

Figure 2:
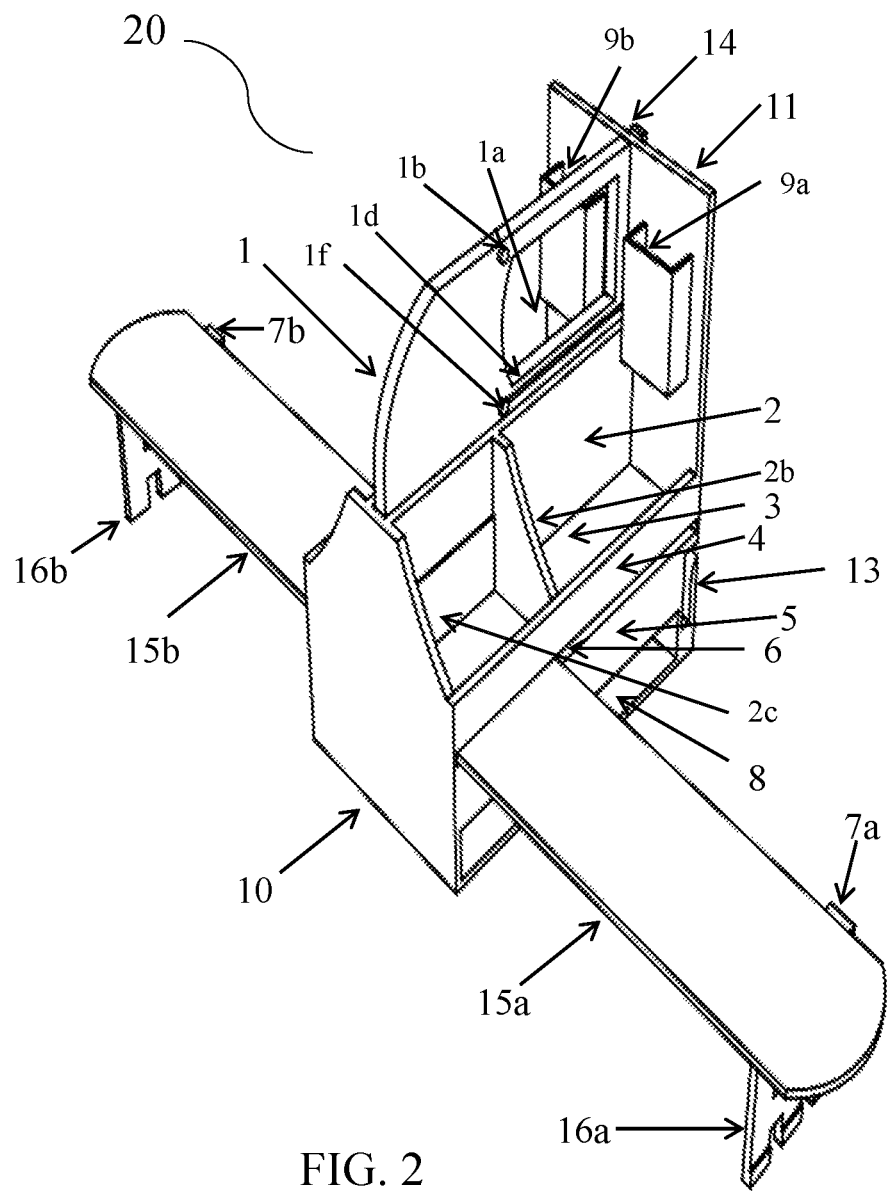
FIG. 2 is a perspective view of the exemplary embodiment of the seat divider of the present invention with the desk top tables on either side of the seat divider extended with their legs down to anchor the tables.

Referring now to FIG. 2 another perspective view of the exemplary embodiment of the seat divider 20 is shown with the top divider panel 1 extended upward, with a view of the open two-way viewing window 1a and further illustrating the manner in which the recessed desktop tables extend from both the left hand and right hand sides of the seat divider 20. In this figure, desktop table 15a can be seen extended from its insert sleeve 6 using lever 7a and anchored in place through the desktop leg 16a or supported by the armrest on that side of the car back seat without the need to unfold the leg. In general, the desktop tables can be constructed of any length to be able to reach the armrests in the back seat of any size vehicle.

Similarly, the desktop table 15b recessed in its insert sleeve (not shown) on the left side of the seat divider 20 is shown extended using lever 7b and anchored down with desktop leg 16b or in the alternative supported by the armrest on the left side of the car back seat. The desktop table legs are capable of being recessed and unfolded when needed. In general, the desk top tables advantageously provide the child on either side of the seat divider 20 a surface to place their books, papers and other materials while engaged in writing, coloring, or in the alternative placing a DVD player or small lap top to play electronic games or watch a movie. The ability to recess the desktop tables and their legs into their insert sleeves provides the child with leg room when the desktops are not needed.

Figure 3:
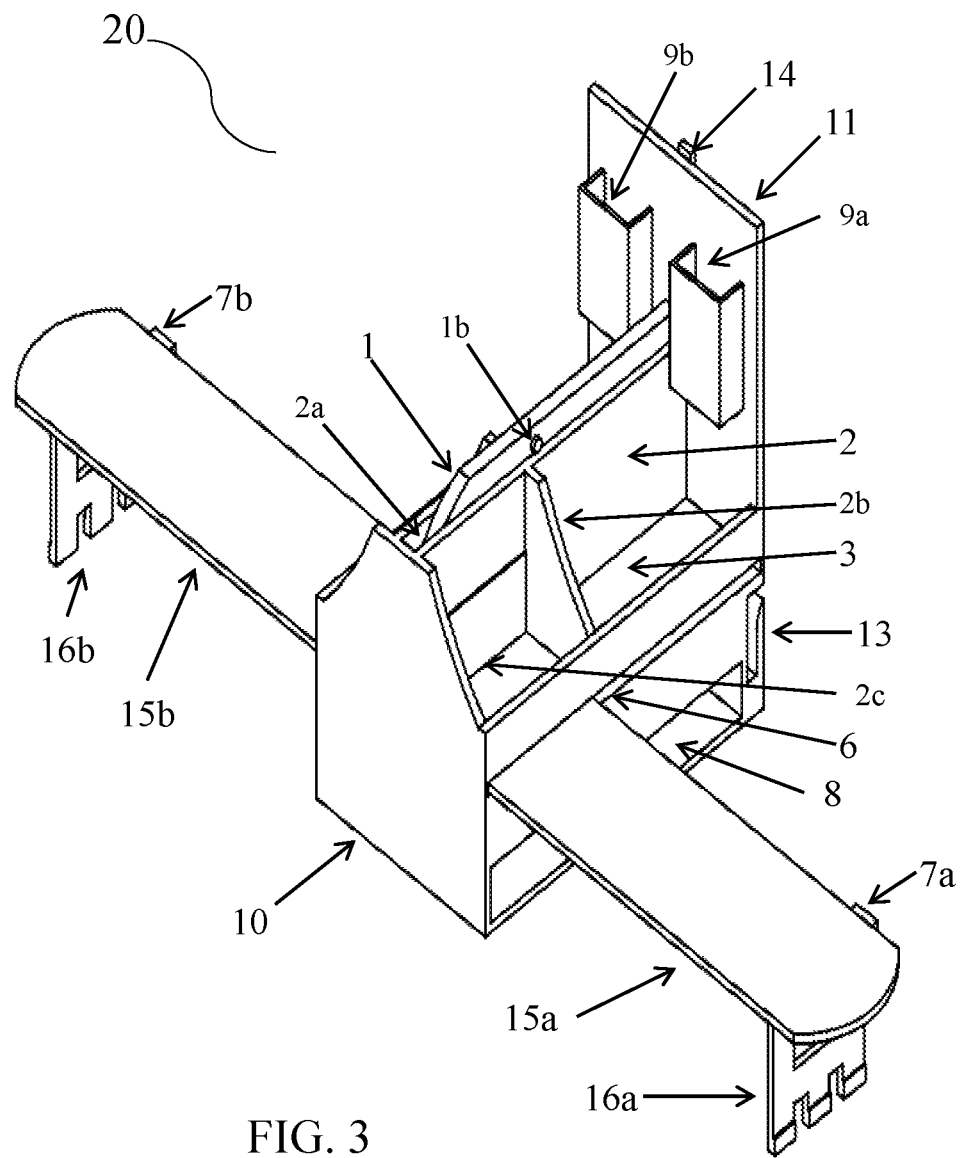
FIG. 3 is a perspective view of the embodiment of the seat divider of the present invention with in addition to the extended desk top tables, the top divider panel is shown lowered and recessed within the recess sleeve housed within the middle divider panel of the seat divider.

FIG. 3 is a perspective view of the seat divider 20 illustrating the manner in which the top divider panel 1 is recessed within the insert sleeve 2a of the middle divider panel member 2. The child seated on either side of the seat divider 20 can raise or lower the top divider panel 1 when they wish to do so to communicate with each other in a civil manner. The child seated on the right side of the seat divider uses knob 1b on the top right side of the top divider panel 1 and the child seated on the left side of the seat divider 20 uses knob 1c (not shown) on his/her side to raise and lower the top divider panel 1. This figure also shows the desktop tables 15a and 15b on either side of the seat divider 20 extended for use.

Figure 4:
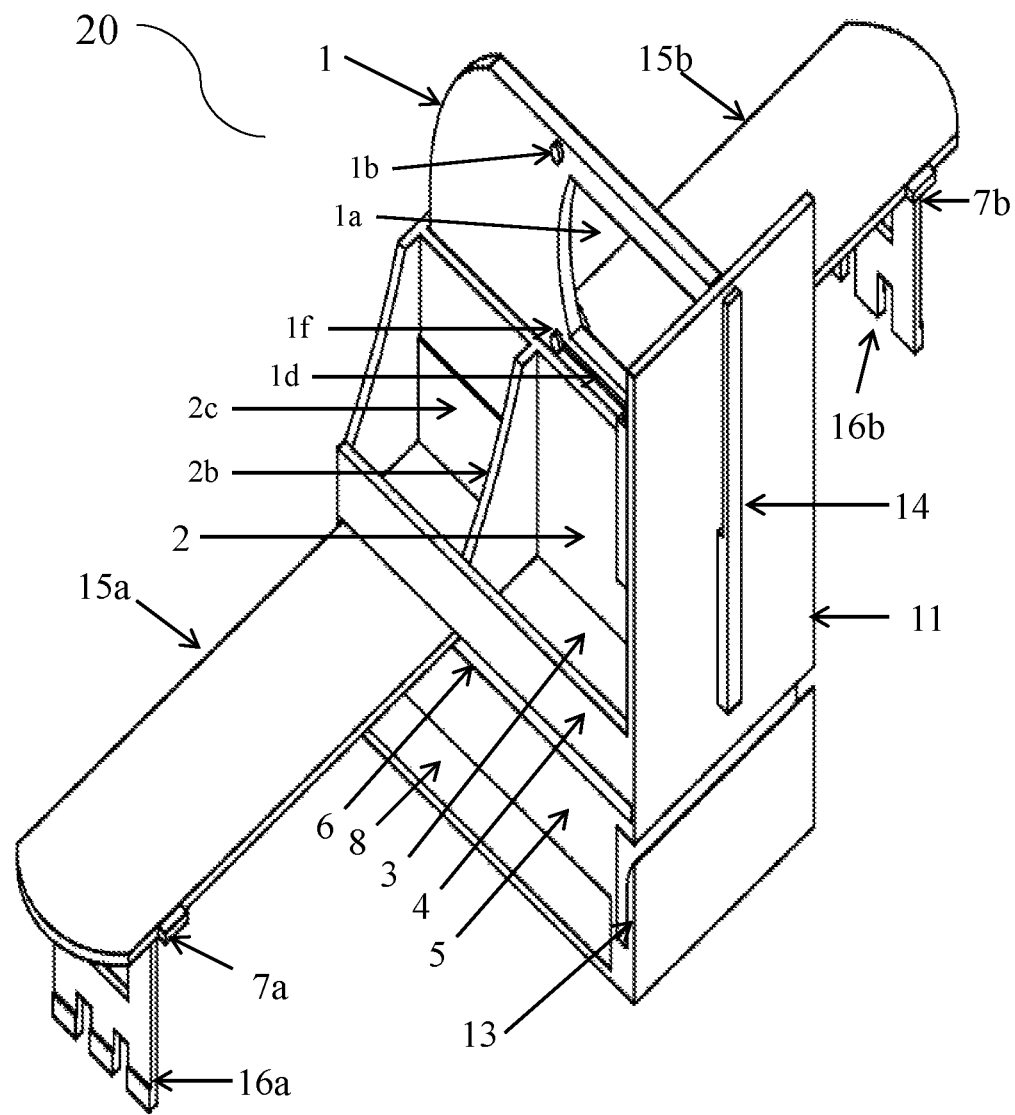
FIG. 4 is a perspective view of the seat divider of the present invention when viewed from the right side and back of the seat divider.

FIG. 4 is a perspective view of the seat divider 20 when viewed from the right side and back side concomitantly. In this figure, the top divider panel 1 is in the extended position with the two-way viewing window 1a also open. The desktop tables 15a and 15b are extended as well and anchored through their legs 16a and 16b. The figure also shows clearer views of the lower seat belt attachment hook 13 through which the middle seat belt is threaded and secured to stabilize the base of the seat divider 20 on the back seat of the vehicle and the upper shoulder strap attachment hook 14 through which the shoulder strap is threaded to secure the top of the seat divider 20 against the back of the seat.

Figure 5:
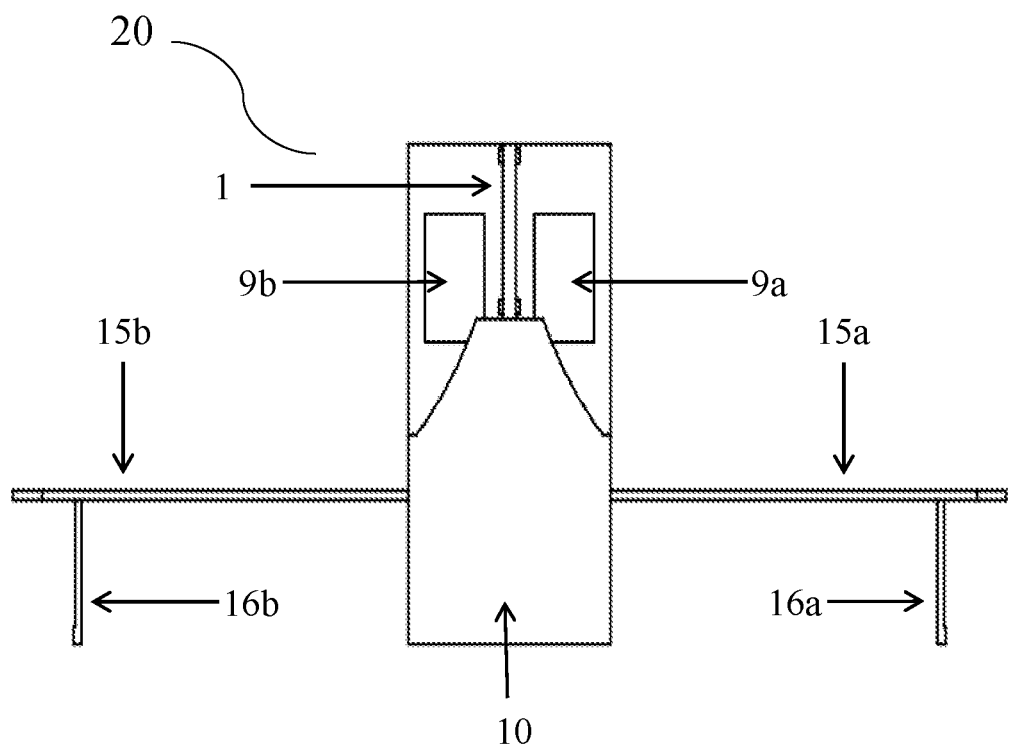
FIG. 5 is the front perspective view of the seat divider of the present invention.

FIG. 5 is the front perspective view of the seat divider 20 of the present invention. In this figure, viewed from the front side of the seat divider 20 the top divider panel 1 is recessed within the insert sleeve of the middle divider panel member and the pocket holders 9a and 9b on the inside back panel can be seen as well as the front panel 10. This front view of the seat divider 20 also shows the extended desktops 15a and 15b and the desktop legs 16a and 16b unfolded and extended down.

Figure 6:
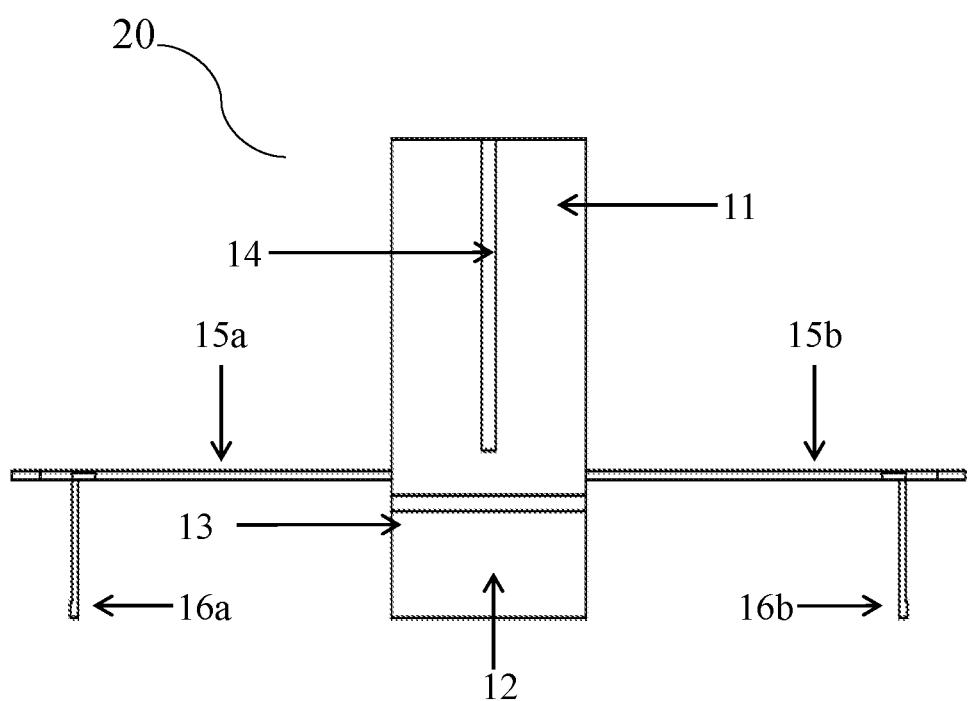
FIG. 6 is the back perspective view of the seat divider of the present invention.

FIG. 6 is the back perspective view of the seat divider 20 of the present invention with a view of the back panel 11 and recessed views of the seat belt attachment hook 13 and shoulder strap attachment hook 14. The figure also shows back views of the extended desktop tables 15a and 15b with their corresponding desktop legs 16a and 16b.

Figure 7:
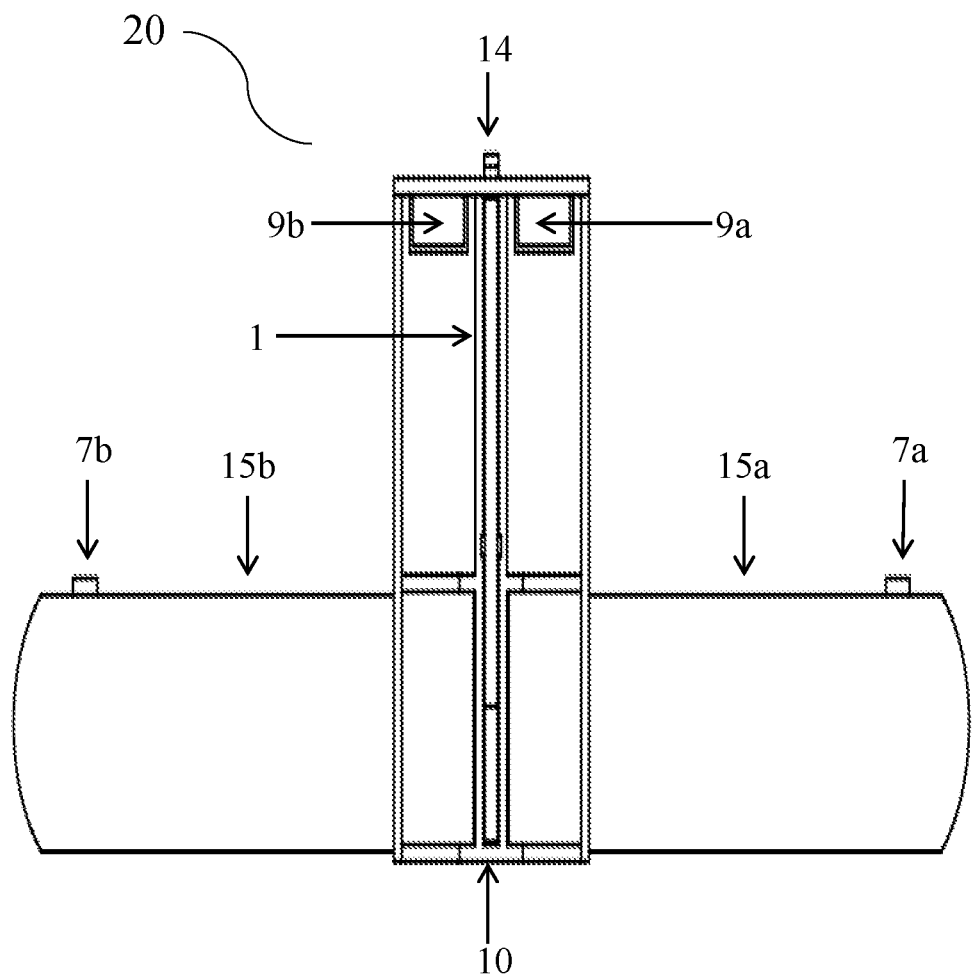
FIG. 7 is a top plan view of the seat divider of the present invention.

FIG. 7 is a top plan view of seat divider 20 of the present invention. In this figure, the top divider panel 1 is recessed and the desktop tables 15a and 15b extended. Elevational views of the pen/pencil holders 9a and 9b are visible. As well, partial views of the front panel 10 and the top of the shoulder strap attachment hook 14.

Figure 8:
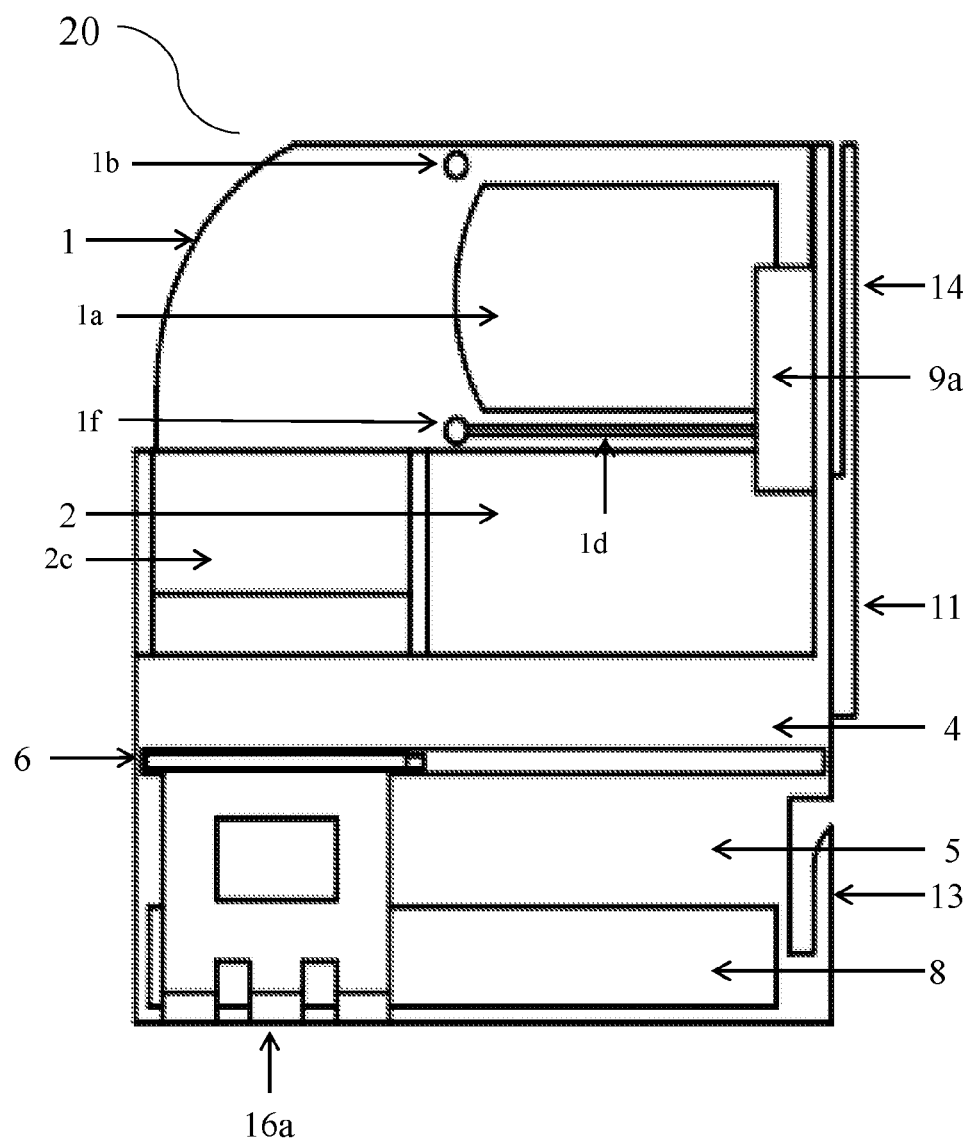
FIG. 8 is a side perspective view of the seat divider of the present invention.

FIG. 8 is a side perspective view of the seat divider 20 of the present invention. In this figure, the desktop table 15a is recessed within the insert sleeve 6 and the desktop leg 16a recessed as well. The top divider panel 1 is seen in its extended position with the two-way viewing window 1a open. This side view of the seat divider 20 more clearly and particularly illustrates the configurations of the seat belt attachment hook 13 and the shoulder strap attachment hook 14.

Figure 9:
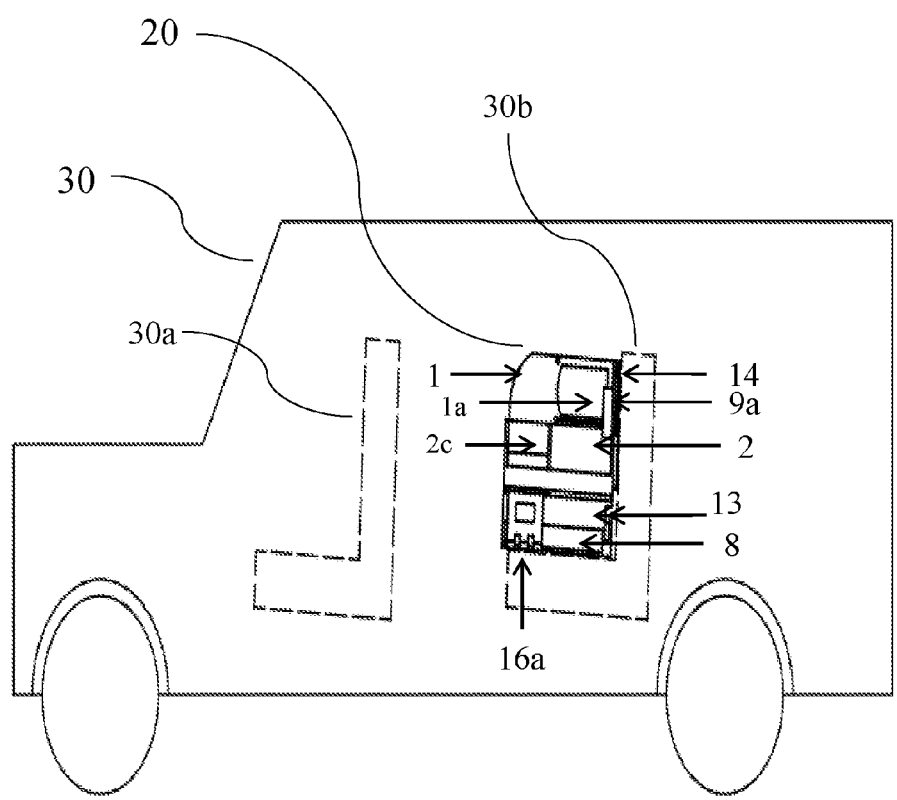
FIG. 9 is a perspective side view of the seat divider as it is positioned on the back seat of an automobile as viewed from a cutaway of the vehicle.

FIG. 9 is a perspective side view of the seat divider 20 of the present invention as it is positioned on the back seat 30b of an automobile 30 with front seat 30a from a cutaway image of the vehicle. In this figure, the top divider panel 1 of the seat divider 20 is in an extended position and also shows the two-way viewing window 1a as well as a few other structures described in the previous figures.

Figure 10:
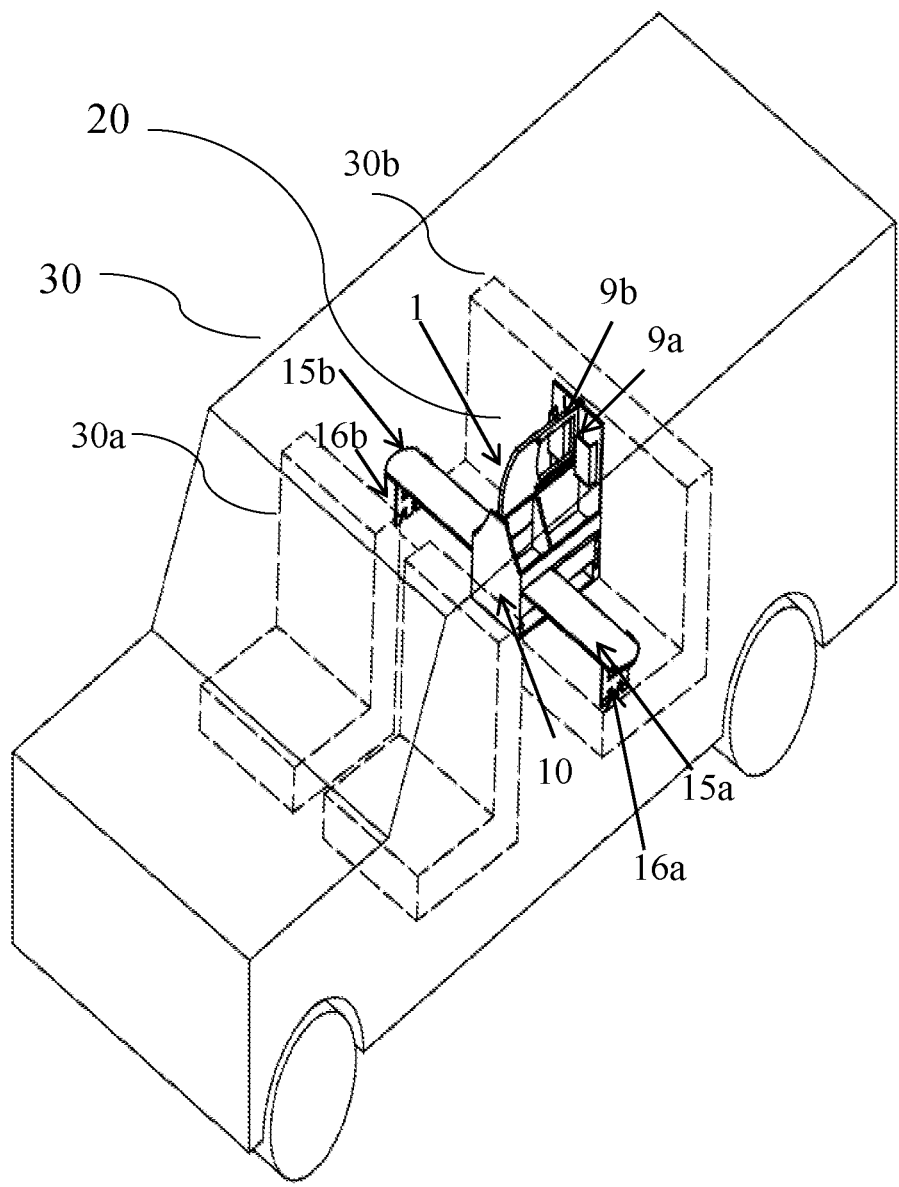
FIG. 10 is a perspective view of the seat divider of the present invention seen in an automobile cutaway when it is installed in the back seat of the vehicle with the desk top tables and legs extended on either side of the seat divider and the top divider panel fully extended upward showing the two way window opening in the open position.

FIG. 10 is a perspective view of the seat divider 20 of the present invention visualized from the front of an automobile 30 cutaway when it is installed in the back seat 30b of the vehicle. In this figure, the desktop tables 15a and 15b have been extended from their insert sleeves within the middle divider member with their respective legs 16a and 16b unfolded down to anchor the desktop tables to the seat. The top divider panel 1 is also fully extended upward showing the two-way window opening in the open position.

The seat divider 20 of the present invention is advantageously constructed from sturdy materials comprising wood, durable plastic or other similar materials and may be made available in a choice of colors.

The foregoing description of the invention through its figures and preferred embodiments should not be construed to limit the scope of the invention. It is to be understood that the embodiments of the seat divider 20 of the present invention as described herein do not limit any application or scope of the invention and that the invention can be carried out and practiced in various ways and implemented in embodiments other than the ones outlined in the description above. It should be understood and obvious to one skilled in the art that alternatives, modifications, and variations of the embodiments of the present invention may be construed as being within the spirit and scope of the appended claims.

What is claimed is:

1. A seat divider for an automobile comprising:
   a base panel structure member;
   a front panel structure member;
   a back panel structure member;
   a middle divider panel structure member;
   a top divider panel structure member hingedly connected to said middle divider panel structure member;
   said top divider panel structure member recessed within an insert sleeve member located in said middle divider panel structure member and capable of being raised and lowered using knob structure members;
   said top panel structure member having a two-way viewing window capable of being opened and closed with window pane panel members;
   a tray member projecting from either side of the said middle divider panel structure member;
   a vertical tray divider member, capable of sliding over said tray member floor by means of an adjustable slider member;
   a set of desktop table structure members recessed within insert sleeve members located on said base member;
   a set of desktop table structure member legs capable of being recessed within said insert sleeve members located on the said base member;
   a lower seat belt attachment hook structure member; and
   an upper shoulder strap attachment hook structure member.

2. The seat divider of claim 1 wherein the capability of the top divider panel structure member to be raised and lowered allows the children seated on either side of the seat divider to have occasional visual contact and communication with each other.

3. The seat divider of claim 1 wherein the two way viewing window structure member allows for visual contact between children seated on either side of the seat divider without the need to lower the top divider panel structure member.

4. The seat divider of claim 1 wherein the lower seat belt attachment hook structure member allows the middle seat belt to be inserted through the lower seat belt attachment hook structure member to secure the seat divider to a base of a seat.

5. The seat divider of claim 1 wherein the shoulder strap attachment hook member allows a shoulder strap of a middle seat to be inserted through the shoulder strap attachment hook structure member to secure the seat divider to a back of a seat.

6. The seat divider of claim 1 wherein the sliding of the vertical tray divider member over the tray floor by means of the adjustable slider member allows for the creation of bin spaces of required capacity to hold toys, books and other materials for the use of the child seated on either side of the seat divider.

7. The seat divider of claim 1 wherein the base structure member is configured with an open storage space to store toys, books, DVD's and other materials for use by the child.

8. The seat divider of claim 1 wherein a front of the back panel structure member has built-in pen and pencil holders within easy access to the child.

9. The seat divider of claim 1 wherein the set of desktop table structure members recessed within the insert sleeve members located on the middle divider panel structure member can be extended by means of lever members attached to the desktop table structure members and retracted in the same manner to recess within the insert sleeve members when not in use.

10. The seat divider of claim 1 wherein the desktop table structure member legs are capable of being unfolded to anchor the desktop table structure members.

11. The seat divider of claim 1 wherein the desktop table structure members can be supported by an armrest on either side of a seat rather than through the use of the desktop table structure member legs.

12. The seat divider of claim 1 wherein the desk top table structure members can be constructed of any length to be able to reach armrests in a back seat of any size vehicle.

\* \* \* \* \*